(12) United States Patent
Abbott, III et al.

(10) Patent No.: US 8,406,592 B2
(45) Date of Patent: Mar. 26, 2013

(54) BEND RESISTANT MULTIMODE OPTICAL FIBER

(75) Inventors: John Steele Abbott, III, Elmira, NY (US); Scott Robertson Bickham, Corning, NY (US); Dana Craig Bookbinder, Corning, NY (US); Ming-Jun Li, Horseheads, NY (US); Chukwuemeka Benneth Onuh, Wilmington, NC (US); Kimberly Ann Wilbert, Wilmington, NC (US)

(73) Assignee: Corning Incorporated, Corning, NY (US)

( * ) Notice: Subject to any disclaimer, the term of this patent is extended or adjusted under 35 U.S.C. 154(b) by 202 days.

(21) Appl. No.: 12/333,833

(22) Filed: Dec. 12, 2008

(65) Prior Publication Data

US 2009/0154888 A1  Jun. 18, 2009

Related U.S. Application Data

(63) Continuation-in-part of application No. 12/250,987, filed on Oct. 14, 2008, now abandoned.

(60) Provisional application No. 61/007,498, filed on Dec. 13, 2007, provisional application No. 61/009,803, filed on Jan. 2, 2008, provisional application No. 61/133,612, filed on Jul. 1, 2008.

(51) Int. Cl.
*G02B 6/028* (2006.01)

(52) U.S. Cl. ........................................ 385/124; 385/126

(58) Field of Classification Search ........... 385/123–127
See application file for complete search history.

(56) References Cited

U.S. PATENT DOCUMENTS

| | | | |
|---|---|---|---|
| 4,149,772 A | 4/1979 | Iyengar et al. | 350/96.33 |
| 4,176,911 A | 12/1979 | Marcatili et al. | 350/96.31 |
| 4,184,744 A | 1/1980 | Onoda et al. | 350/96.33 |
| 4,229,070 A | 10/1980 | Olshansky et al. | 350/96.31 |
| 4,281,893 A | 8/1981 | Yamada et al. | 350/96.31 |
| 4,339,174 A | 7/1982 | Levin | 350/96.31 |
| 4,715,695 A | 12/1987 | Nishimura et al. | 350/96.31 |
| 4,852,968 A * | 8/1989 | Reed | 385/127 |
| 4,877,304 A * | 10/1989 | Bhagavatula | 385/124 |
| 5,123,076 A | 6/1992 | Nishimoto et al. | 385/124 |
| 5,175,785 A * | 12/1992 | Dabby | 385/123 |
| 5,191,206 A | 3/1993 | Boiarski et al. | 250/227.14 |
| 5,802,236 A | 9/1998 | DiGiovanni et al. | 385/127 |
| 5,907,652 A * | 5/1999 | DiGiovanni et al. | 385/125 |
| 6,266,467 B1 * | 7/2001 | Kato et al. | 385/123 |
| 6,334,019 B1 * | 12/2001 | Birks et al. | 385/125 |
| 6,614,974 B2 | 9/2003 | Elrefaie et al. | 385/125 |
| 6,636,675 B2 | 10/2003 | Soufiane | 385/123 |

(Continued)

FOREIGN PATENT DOCUMENTS

EP  0 131 729 A1  1/1985
EP  1043609  10/1999

(Continued)

OTHER PUBLICATIONS

Donlagic, D., "Opportunities to Enhance Multimode Fiber Links by Application of Overfilled Launch," Journal of Lightwave Technology, vol. 23, No. 11, Nov. 2005, p. 3526-3540.*

(Continued)

*Primary Examiner* — Charlie Peng
*Assistant Examiner* — Peter Radkowski
(74) *Attorney, Agent, or Firm* — Robert L. Carlson

(57) ABSTRACT

Bend resistant multimode optical fibers are disclosed herein. Multimode optical fibers disclosed herein comprise a core region and a cladding region surrounding and directly adjacent to the core region, the cladding region comprising a depressed-index annular portion comprising a depressed relative refractive index which is spaced from the core at least 0.5 microns and less than 4 microns.

28 Claims, 4 Drawing Sheets

U.S. PATENT DOCUMENTS

| | | | | |
|---|---|---|---|---|
| 6,671,442 | B2 | 12/2003 | Wang et al. | 385/125 |
| 6,687,445 | B2* | 2/2004 | Carter et al. | 385/127 |
| 6,766,088 | B2 | 7/2004 | Hasegawa et al. | 385/123 |
| 6,773,825 | B2 | 8/2004 | Pickrell et al. | 428/566 |
| 6,795,635 | B1 | 9/2004 | Fajardo et al. | 385/140 |
| 6,904,215 | B2 | 6/2005 | Christoff et al. | 385/124 |
| 7,039,284 | B2 | 5/2006 | Nakahara | 385/125 |
| 7,043,125 | B2* | 5/2006 | Diep et al. | 385/123 |
| 7,043,128 | B2 | 5/2006 | DiGiovanni et al. | 385/126 |
| 7,054,513 | B2 | 5/2006 | Herz et al. | 385/12 |
| 7,072,552 | B2 | 7/2006 | Manyam et al. | 385/125 |
| 7,142,758 | B1 | 11/2006 | Herz et al. | 385/125 |
| 7,174,078 | B2 | 2/2007 | Libori et al. | 385/125 |
| 2003/0026566 | A1* | 2/2003 | Diep et al. | 385/123 |
| 2003/0165313 | A1* | 9/2003 | Broeng et al. | 385/125 |
| 2003/0210878 | A1* | 11/2003 | Kumano et al. | 385/127 |
| 2004/0069019 | A1 | 4/2004 | Carter et al. | 65/414 |
| 2004/0086245 | A1* | 5/2004 | Farroni et al. | 385/123 |
| 2004/0228593 | A1 | 11/2004 | Sun et al. | 385/127 |
| 2005/0069269 | A1* | 3/2005 | Libori et al. | 385/125 |
| 2005/0094954 | A1 | 5/2005 | Pickrell et al. | 385/123 |
| 2006/0034574 | A1 | 2/2006 | Guan et al. | 385/125 |
| 2006/0034575 | A1* | 2/2006 | Sako et al. | 385/127 |
| 2006/0039665 | A1* | 2/2006 | Matsuo et al. | 385/127 |
| 2006/0093297 | A1* | 5/2006 | Sako et al. | 385/126 |
| 2006/0120678 | A1* | 6/2006 | Manyam et al. | 385/125 |
| 2006/0198589 | A1* | 9/2006 | Sako et al. | 385/123 |
| 2006/0263019 | A1 | 11/2006 | Negishi et al. | 385/123 |
| 2007/0104437 | A1* | 5/2007 | Bookbinder et al. | 385/125 |
| 2007/0189684 | A1* | 8/2007 | Matsuo et al. | 385/123 |
| 2007/0280615 | A1* | 12/2007 | de Montmorillon et al. | 385/127 |
| 2008/0013905 | A1 | 1/2008 | Bookbinder et al. | 385/124 |
| 2008/0138022 | A1* | 6/2008 | Tassone | 385/124 |
| 2008/0152288 | A1* | 6/2008 | Flammer et al. | 385/124 |
| 2008/0166094 | A1 | 7/2008 | Bookbinder et al. | 385/124 |
| 2008/0226241 | A1* | 9/2008 | Sugizaki et al. | 385/114 |
| 2009/0052851 | A1* | 2/2009 | Donlagic | 385/124 |

FOREIGN PATENT DOCUMENTS

| | | |
|---|---|---|
| EP | 1083446 | 2/2000 |
| EP | 1617243 A1 | 3/2004 |
| EP | 1482606 A1 | 5/2004 |
| EP | 1564569 A1 | 9/2004 |
| FR | 2 349 842 | 11/1977 |
| JP | 2006-47719 | 2/2006 |
| WO | WO02/075393 | 9/2002 |
| WO | WO02/102730 | 12/2002 |
| WO | WO2006/010798 | 2/2006 |
| WO | WO2006/018798 | 2/2006 |
| WO | WO2008/005233 | 1/2008 |

OTHER PUBLICATIONS

Huber, P., et al., "Properties of fibres drawn from uncollapsed VCVD preforms" Proceedings of the European Conference on Optical Communication 21-24, Sep. 1982, pp. 51-53.

Katsunari Okamoto and Takanori Okoshi, "Analysis of Wave Propagation in Optical Fibers Having Core with α-Power Refractive-Index Distribution and Uniform Cladding", IEE Transactions on Microwave Theory and Techniques, vol. MIT-24, No. 7, Jul. 1976, pp. 416-421.

D. Gloge, "Bending Loss in Multimode Fibers with Graded and Ungraded Core Index", Applied Optics, vol. 11, No. 11, Nov. 1972, pp. 2506-2513.

Robert Olshansky, "Mode Coupling Effects in Graded-Index Optical Fibers", Applied Optics, vol. 14, No. 4, Apr. 1975, pp. 935-945.

Denis Donlagić, "Opportunities to Enhance Multimode Fiber Links by Application of Overfilled Launch", Journal of Lightwave Technology, vol. 23, No. 11, Nov. 2005, pp. 3526-3540.

Mashahiro Geshiro, Masanori Matsuhara, and Nobuaki Kumagi, "Truncated Parabolic-Index Fiber with Minimum Mode Dispersion", IEE Transactions on Microwave Theory and Techniques, vol. MTT-26, No. 2, Feb. 1978, pp. 115-119.

Baggett, Joanne C. et al, "Improving Bending Losses in Holey Fibers", Optical Fiber Communication Conference, 2005. Technical Digest. OFC/NFOEC, Mar. 6-11, 2005, vol. 3, 3 pp.

Bing, Y. et al, "Low-loss Holey Fiber", Hitachi Cable Review No. 24, Aug. 2005, pp. 1-5.

Ellis, Frederick P. K., "Fabrication of Random Hole Optical Fiber Preforms by Silica Sol-Gel Processing", Thesis to be submitted to Virginia Polytechnic Institute and State University, Feb. 19, 2004, 34 pp.

Guan, Ning et al, "Characteristics of field confined holey fiber analyzed by boundary element method", OFC 2002, Mar. 17-22, 2002, pp. 525-527.

Holton, Carvel et al, "Colloidal Quantum Dots Entrained in Microstructured Optical Fibers", Proceedings of SPIE, 2004, vol. 5335, pp. 258-265.

Kominsky, Daniel, "Development of Random Hole Optical Fiber and Crucible Technique Optical Fibers", Dissertation submitted to Virginia Polytechnic Institute and State University, Sep. 6, 2005, 142 pages.

Kominsky, D. et al, "Generation of random-hole optical fiber", Optics Letters, Aug. 15, 2003, vol. 23, No. 16, pp. 1409-1411.

Matsuo, S. et al, "Bend-Insensitive and Low-Splice-Loss Optical fiber for Indoor Wiring in FTTH", Optical Fiber Communication Conference, 2004, Feb. 23-27, 2004, vol. 2, 3 pgs. with descriptive sheet attached.

Monro, Tanya M. et al, "Holey fibers with random cladding distributions", Optics Letters, Feb. 15, 2000, vol. 25, No. 4, pp. 206-208.

Monro, Tanya M. et al, "Holey fibers with randomly arranged air holes", Conference on Lasers and Electro-Optics, 2000. (CLEO 2000), pp. 607-608.

Monro, Tanya M. et al, "New possibilities with holey fibers", Optical Fiber Communication Conference, 2000, vol. 3, pp. 106-108.

Pickrell, Gary et al, "Fiber Optic Chemical Sensing", Proceedings of SPIE, vol. 5998, Nov. 5, 2005, 15 pp.

Pickrell, Gary et al, "Microstructural Analysis of Random Hole Optical Fibers", IEEE Photonics Technology Letters, Feb. 2004, vol. 16, No. 2, pp. 491-493.

Pickrell, Gary R. et al, "New fabrication technique for random-hold optical fibers", Proceedings of SPIE—The International Society for Optical Engineering, v 5589, Fiber Optic Sensor Technology and Applications III, Oct. 26-28, 2004, pp. 257-265.

Pickrell, Gary R. et al, "Novel Techniques for the Fabrication of Holey Optical Fibers", The International Society for Optical Engineering, v 4578, Fiber Optic Sensor Technology and Applications 2001, Oct. 30-Nov. 1, 2001, pp. 271-282.

Pickrell, G. et al, "Random-hole optical fiber evanescent-wave gas sensing", Optics Letters, Jul. 1, 2004, vol. 29, No. 13, pp. 1476-1478.

Pickrell, Gary R. et al, "Random Hole Optical Fibers", Proceedings of SPIE, Industrial and Highway Sensors Technology, 2003, vol. 5272, pp. 207-215.

Richardson, D. J. et al, "Advances in Microstructured Fiber Technology", Proceedings of 2005 IEEE/LEOS Workshop on Fibres and Optical Passive Components, Jun. 22-24, 2005, pp. 1-9.

Shinohara, Hiromichi, "Broadband Access in Japan: Rapidly Growing FTTH Market", IEEE Communications Magazine, Sep. 2005, pp. 72-78.

Wu, Tzong-Lin et al, "A Novel Ultraflattened Dispersion Photonic Crystal Fiber", IEEE Photonics Technology Letters, Jan. 2005, vol. 17, No. 1, pp. 67-69.

Endo, Hideki, et al. "Modal Bandwidth Enhancement in a Plastic Optical Fiber by W-Refractive Index Profile", Journal of Lightwave Technology, vol. 23, No. 4, Apr. 2005, pp. 1754-1762.

Okamoto, Katsunari et al, "Computer-Aided Synthesis of the Optimum Refractive-Index Profile for a Multimode Fiber," IEEE Transactions on Microwave Theory and Techniques, vol. MTT-25, No. 3, pp. 213-221, Mar. 1977.

Stoltz, B. et al, "Correcting Multimode Fiber Profiles with Differential Mode Delay," Journal of Optical Communications, vol. 4, No. 4, pp. 139-147, 1983.

* cited by examiner

BEND RESISTANT MULTIMODE OPTICAL FIBER

CROSS-REFERENCE TO RELATED APPLICATIONS

This application is a Continuation-In-Part of U.S. application Ser. No. 12/250,987, filed Oct. 14, 2008 now abandoned, and claims the benefit of, and priority to U.S. Provisional Patent Application No. 61/007,498 filed on Dec. 13, 2007, U.S. Provisional Patent Application No. 61/009,803 filed on Jan. 2, 2008 and U.S. Provisional Patent Application No. 61/133,612 filed on Jul. 1, 2008, and U.S. application Ser. No. 12/250,987, filed Oct. 14, 2008, entitled "Bend Resistant Multimode Optical Fiber", the content of each of which is relied upon and incorporated herein by reference in their entirety.

BACKGROUND OF THE INVENTION

1. Field of the Invention

The present invention relates generally to optical fibers, and more specifically to multimode optical fibers.

2. Technical Background

Corning Incorporated manufactures and sells InfiniCor® 62.5 μm optical fiber, which is multimode optical fiber having a core with a maximum relative refractive index delta of about 2% and 62.5 μm core diameter, as well as InfiniCor® 50 μm optical fiber, which is multimode optical fiber having a core with a maximum relative refractive index delta of about 1% and 50 μm core diameter.

SUMMARY OF THE INVENTION

Bend resistant multimode optical fibers are disclosed herein. Multimode optical fibers disclosed herein comprise a graded-index core region and a cladding region surrounding and directly adjacent to the core region, the cladding region comprising a depressed-index annular portion comprising a depressed relative refractive index relative to another portion of the cladding. The depressed-index annular portion of the cladding is preferably spaced apart from the core. Preferably, the refractive index profile of the core has a parabolic or substantially shape. The depressed-index annular portion may, for example, comprise glass comprising a plurality of voids, or glass doped with a downdopant such as fluorine, boron or mixtures thereof, or glass doped with one or more of such downdopants and additionally glass comprising a plurality of voids.

In some embodiments, the multimode optical fiber comprises a graded index glass core; and a cladding surrounding and in contact with the core, the cladding comprising a depressed-index annular portion surrounding the core, said depressed-index annular portion having a refractive index delta less than about −0.2% and a width of at least 1 micron, said depressed-index annular portion spaced from said core at least 0.5 microns.

In some embodiments that comprise a cladding with voids, the voids in some preferred embodiments are non-periodically located within the depressed-index annular portion. By "non-periodically located", we mean that when one takes a cross section (such as a cross section perpendicular to the longitudinal axis) of the optical fiber, the non-periodically disposed voids are randomly or non-periodically distributed across a portion of the fiber (e.g. within the depressed-index annular region). Similar cross sections taken at different points along the length of the fiber will reveal different randomly distributed cross-sectional hole patterns, i.e., various cross sections will have different hole patterns, wherein the distributions of voids and sizes of voids do not exactly match. That is, the voids or voids are non-periodic, i.e., they are not periodically disposed within the fiber structure. These voids are stretched (elongated) along the length (i.e. parallel to the longitudinal axis) of the optical fiber, but do not extend the entire length of the entire fiber for typical lengths of transmission fiber. It is believed that the voids extend along the length of the fiber a distance less than 20 meters, more preferably less than 10 meters, even more preferably less than 5 meters, and in some embodiments less than 1 meter.

In some embodiments, the fiber comprises a depressed index annular region which comprises fluorine, and the core preferably has an outer radius R1 between 23 and 26 microns. The fiber further preferably comprises an inner annular cladding region which comprises a width of greater than 0.5 microns and less than 3 microns, and the inner cladding further preferably comprises a peak fluorine concentration greater than 0.2 wt percent and a peak germania concentration greater than 0.2 wt percent. The depressed index cladding region preferably comprises a depressed-index having a refractive index delta less than about −0.2% and a width of at least 1 micron.

The multimode optical fiber disclosed herein exhibits very low bend induced attenuation, in particular very low macrobending induced attenuation. In some embodiments, high bandwidth is provided by low maximum relative refractive index in the core, and low bend losses are also provided. Consequently, the multimode optical fiber may comprise a graded index glass core; and an inner cladding surrounding and in contact with the core, and a second cladding comprising a depressed-index annular portion surrounding the inner cladding, said depressed-index annular portion having a refractive index delta less than about −0.2% and a width of at least 1 micron, wherein the width of said inner cladding is at least 0.5 microns and the fiber further exhibits a 1 turn 10 mm diameter mandrel wrap attenuation increase, of less than or equal to 0.4 dB/turn at 850 μm, a numerical aperture of greater than 0.14, more preferably greater than 0.17, even more preferably greater than 0.18, and most preferably greater than 0.185, and an overfilled bandwidth greater than 1.5 GHz-km at 850 nm.

Using the designs disclosed herein, 50 micron diameter core multimode fibers can be made which provide (a) an overfilled (OFL) bandwidth of greater than 1.5 GHz-km, more preferably greater than 2.0 GHz-km, even more preferably greater than 3.0 GHz-km, and most preferably greater than 4.0 GHz-km at a wavelength of 850 nm. These high bandwidths can be achieved while still maintaining a 1 to 10 mm diameter mandrel wrap attenuation increase at a wavelength of 850 nm, of less than 0.5 dB, more preferably less than 0.3 dB, even more preferably less than 0.2 dB, and most preferably less than 0.15 dB. These high bandwidths can also be achieved while also maintaining a 1 turn 20 mm diameter mandrel wrap attenuation increase at a wavelength of 850 nm, of less than 0.2 dB, more preferably less than 0.1 dB, and most preferably less than 0.05 dB, and a 1 turn 15 mm diameter mandrel wrap attenuation increase at a wavelength of 850 nm, of less than 0.2 dB, preferably less than 0.1 dB, and more preferably less than 0.05 dB. Such fibers are further capable of providing a numerical aperture (NA) greater than 0.17, more preferably greater than 0.18, and most preferably greater than 0.185. Such fibers are further simultaneously capable of exhibiting an OFL bandwidth at 1300 mm which is greater than 500 MHz-km, more preferably greater than 600 MHz-km, even more preferably greater than 700 MHz-kn.

Such fibers are further simultaneously capable of exhibiting minimum calculated effective modal bandwidth (Min EMBc) bandwidth of greater than about 1.5 MHz-km, more preferably greater than about 1.8 MHz-km and most preferably greater than about 2.0 MHz-km at 850 nm.

Preferably, the multimode optical fiber disclosed herein exhibits a spectral attenuation of less than 3 dB/km at 850 nm, preferably less than 2.5 dB/km at 850 nm, even more preferably less than 2.4 dB/km at 850 nm and still more preferably less than 2.3 dB/km at 850 nm. Preferably, the multimode optical fiber disclosed herein exhibits a spectral attenuation of less than 1.0 dB/km at 1300 nm, preferably less than 0.8 dB/km at 1300 nm, even more preferably less than 0.6 dB/km at 1300 nm. In some embodiments it may be desirable to spin the multimode fiber, as doing so may in some circumstances further improve the bandwidth for optical fiber having a depressed cladding region. By spinning, we mean applying or imparting a spin to the fiber wherein the spin is imparted while the fiber is being drawn from an optical fiber preform, i.e. while the fiber is still at least somewhat heated and is capable of undergoing non-elastic rotational displacement and is capable of substantially retaining the rotational displacement after the fiber has fully cooled.

In some embodiments, the numerical aperture (NA) of the optical fiber is preferably less than 0.23 and greater than 0.17, more preferably greater than 0.18, and most preferably less than 0.215 and greater than 0.185.

In some embodiments, the core extends radially outwardly from the centerline to a radius R1, wherein $10 \leq R1 \leq 40$ microns, more preferably $20 \leq R1 \leq 40$ microns. In some embodiments, $22 \leq R1 \leq 34$ microns. In some preferred embodiments, the outer radius of the core is between about 22 to 28 microns. In some other preferred embodiments, the outer radius of the core is between about 28 to 34 microns.

In some embodiments, the core has a maximum relative refractive index, less than or equal to 1.2% and greater than 0.5%, more preferably greater than 0.8%. In other embodiments, the core has a maximum relative refractive index, less than or equal to 1.1% and greater than 0.9%.

In some embodiments, the optical fiber exhibits a 1 turn 10 mm diameter mandrel attenuation increase of no more than 1.0 dB, preferably no more than 0.6 dB, more preferably no more than 0.4 dB, even more preferably no more than 0.2 dB, and still more preferably no more than 0.1 dB, at all wavelengths between 800 and 1400 nm.

In a first aspect, multimode optical fiber is disclosed herein comprising a graded-index glass core, disposed about a longitudinal centerline, and a glass cladding surrounding the core. The cladding comprises an inner annular portion, a depressed-index annular portion, and an outer annular portion. The inner annular portion directly abuts the core, and the depressed-index annular portion directly abuts the inner annular region, and the inner annular portion preferably has a relative refractive index profile having a maximum absolute magnitude, $|\Delta|$, less than 0.05%. In some embodiments, the inner annular portion has a maximum relative refractive index, $\Delta_{2MAX}$, less than 0.05%. All refractive indices are in reference to the outer annular portion as described below.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

DETAILED DESCRIPTION

Figure 1:
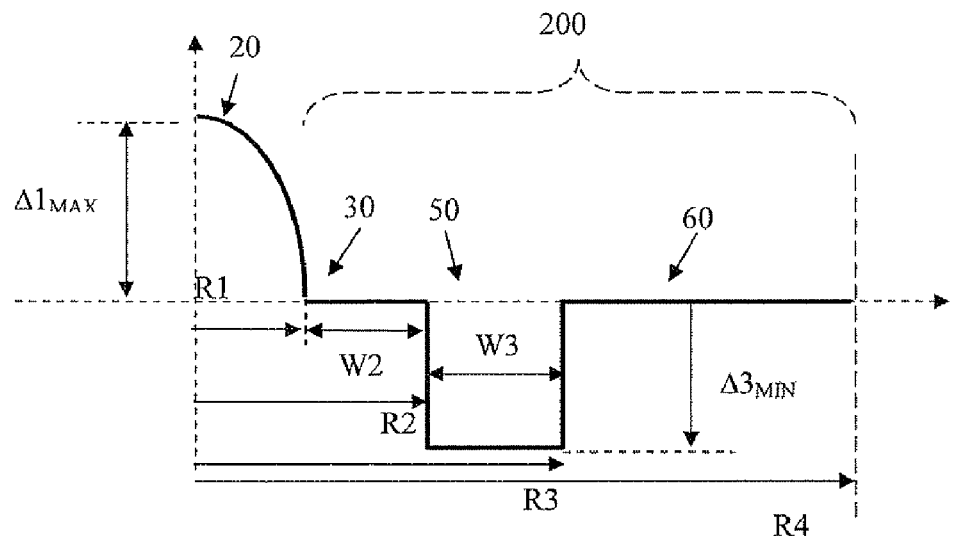
FIG. 1 shows a schematic representation (not to scale) of the refractive index profile of a cross-section of the glass portion of an exemplary embodiment of multimode optical fiber disclosed herein wherein the depressed-index annular portion is offset from the core and is surrounded by an outer annular portion.

Additional features and advantages of the invention will be set forth in the detailed description which follows and will be apparent to those skilled in the art from the description or recognized by practicing the invention as described in the following description together with the claims and appended drawings.

The "refractive index profile" is the relationship between refractive index or relative refractive index and waveguide fiber radius.

The "relative refractive index percent" is defined as $\Delta\% = 100 \times (n_i^2 - n_{REF}^2)/2n_i^2$, where $n_i$ is the maximum refractive index in region i, unless otherwise specified. The relative refractive index percent is measured at 850 nm unless otherwise specified. Unless otherwise specified herein, $n_{REF}$ is the average refractive index of the outer annular portion 60 of the cladding, which can be calculated, for example, by taking "N" index measurements ($n_{C1}, n_{C2}, \ldots n_{CN}$) in the outer annular portion of the cladding, and calculating the average refractive index by:

$$n_C = (1/N)\sum_{i=1}^{i=N} n_{Ci}.$$

As used herein, the relative refractive index is represented by Δ and its values are given in units of "%", unless otherwise specified. In cases where the refractive index of a region is less than the reference index $n_{REF}$, the relative index percent is negative and is referred to as having a depressed region or depressed-index, and the minimum relative refractive index is calculated at the point at which the relative index is most negative unless otherwise specified. In cases where the refractive index of a region is greater than the reference index $n_{REF}$, the relative index percent is positive and the region can be said to be raised or to have a positive index. An "updopant" is herein considered to be a dopant which has a propensity to raise the refractive index relative to pure undoped $SiO_2$. A "downdopant" is herein considered to be a dopant which has a propensity to lower the refractive index relative to pure undoped $SiO_2$. An updopant may be present in a region of an optical fiber having a negative relative refractive index when accompanied by one or more other dopants which are not updopants. Likewise, one or more other dopants which are not updopants may be present in a region of an optical fiber having a positive relative refractive index. A downdopant may be present in a region of an optical fiber having a positive relative refractive index when accompanied by one or more other dopants which are not downdopants. Likewise, one or more other dopants which are not downdopants may be present in a region of an optical fiber having a negative relative refractive index.

Macrobend performance was determined according to FOTP-62 (IEC-60793-1-47) by wrapping 1 turn around either a 6 mm, 10 mm, 20 mm or 30 mm diameter mandrel (e.g. "1×10 mm diameter macrobend loss" or the "1×20 mm diameter macrobend loss") and measuring the increase in attenuation due to the bending using an encircled flux (EF) launch condition. The encircled flux was obtained by launching an overfilled pulse into an input end of a 2 m length of Infini-Cor® 50 µm optical fiber which was deployed with a 1×25 mm diameter mandrel near the midpoint. The output end of the InfiniCor® 50 µm optical fiber was spliced to the fiber under test, and the measured bend loss is the ratio of the attenuation under the prescribed bend condition to the attenuation without the bend. The overfilled bandwidth was measured according to FOTP-204 using an overfilled launch. The minimum calculated effective modal bandwidth (Min EMBc) bandwidths were obtained from measured differential mode delay spectra as specified by TIA/EIA-455-220.

As used herein, numerical aperture of the fiber means numerical aperture as measured using the method set forth in TIA SP3-2839-URV2 FOTP-177 IEC-60793-1-43 titled "Measurement Methods and Test Procedures-Numerical Aperture".

The term "α-profile" or "alpha profile" refers to a relative refractive index profile, expressed in terms of Δ(r) which is in units of "%", where r is radius, which follows the equation, $$\Delta(r)=\Delta(r_o)(1-[|r-r_o|/(r_1-r_o)]^\alpha),$$

where $r_o$ is the point at which Δ(r) is maximum, $r_1$ is the point at which Δ(r) % is zero, and r is in the range $r_i \leq r \leq r_f$, where Δ is defined above, $r_i$ is the initial point of the α-profile, $r_f$ is the final point of the α-profile, and α is an exponent which is a real number.

The depressed-index annular portion has a profile volume, $V_3$, defined herein as:

$$2\int_{R_{INNER}}^{R_{OUTER}} \Delta_3(r) r \, dr$$

where $R_{INNER}$ is the depressed-index annular portion inner radius and $R_{OUTER}$ is the depressed-index annular portion outer radius as defined below. For the fibers disclosed herein, the absolute magnitude of $V_3$ is preferably greater than 60%-µm², more preferably greater than 80%-µm², and even more preferably greater than 100%-µm². Preferably the absolute magnitude of $V_3$ is less than 400%-µm², more preferably less than 200%-µm², and even more preferably less than 150%-µm². In some preferred embodiments, the absolute magnitude of $V_3$ is greater than 60%-µm² and less than 200%-µm². In other preferred embodiments, the absolute magnitude of $V_3$ is greater than 80%-µm² and less than 150%-µm².

Multimode optical fiber disclosed herein comprises a core and a cladding surrounding and directly adjacent the core. In some embodiments, the core comprises silica doped with germanium, i.e. germania doped silica. Dopants other than germanium such as $Al_2O_3$ or $P_2O_5$, singly or in combination, may be employed within the core, and particularly at or near the centerline, of the optical fiber disclosed herein to obtain the desired refractive index and density. In some embodiments, the refractive index profile of the optical fiber disclosed herein is non-negative from the centerline to the outer radius of the core. In some embodiments, the optical fiber contains no index-decreasing dopants in the core.

Figure 2:
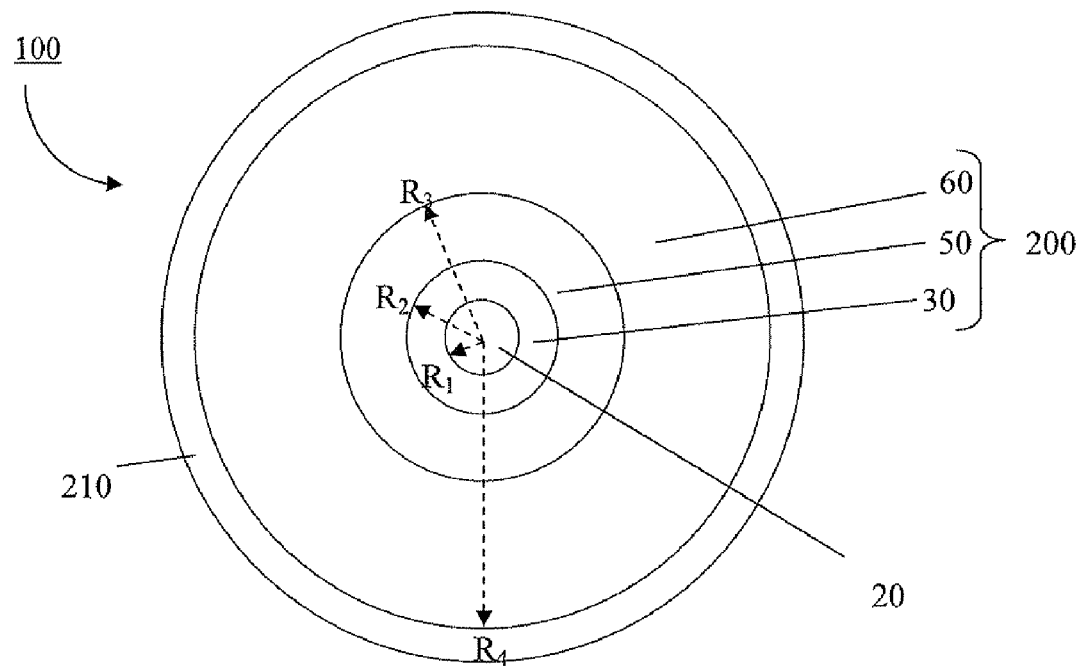
FIG. 2 is a schematic representation (not to scale) of a cross-sectional view of the optical waveguide fiber of FIG. 1.

FIG. 1 shows a schematic representation of the refractive index profile of a cross-section of the glass portion of an embodiment of a multimode optical fiber comprising a glass core 20 and a glass cladding 200, the cladding comprising an inner annular portion 30, a depressed-index annular portion 50, and an outer annular portion 60. FIG. 2 is a schematic representation (not to scale) of a cross-sectional view of the optical waveguide fiber of FIG. 1. The core 20 has outer radius $R_1$ and maximum refractive index delta $\Delta 1_{MAX}$. The inner annular portion 30 has width $W_2$ and outer radius $R_2$. Depressed-index annular portion 50 has minimum refractive index delta percent $\Delta 3_{MIN}$, width $W_3$ and outer radius $R_3$. The depressed-index annular portion 50 is shown offset, or spaced away, from the core 20 by the inner annular portion 30. The annular portion 50 surrounds and contacts the inner annular portion 30. The outer annular portion 60 surrounds and contacts the annular portion 50. The inner annular portion 30 has a refractive index profile $\Delta 2(r)$ with a maximum relative refractive index $\Delta 2_{MAX}$, and a minimum relative refractive index $\Delta 2_{MIN}$, where in some embodiments $\Delta 2_{MAX}=\Delta 2_{MIN}$. The depressed-index annular portion 50 has a refractive index profile $\Delta 3(r)$ with a minimum relative refractive index $\Delta 3_{MIN}$. The outer annular portion 60 has a refractive index profile $\Delta 4(r)$ with a maximum relative refractive index $\Delta 4_{MAX}$ and a minimum relative refractive index $\Delta 4_{MIN}$, where in some embodiments $\Delta 4_{MAX}=\Delta 4_{MIN}$. Preferably, $\Delta 1_{MAX} > \Delta 2_{MAX} > \Delta 3_{MIN}$. In some embodiments, the inner annular portion 30 has a substantially constant refractive index profile, as shown in FIG. 1 with a constant $\Delta 2(r)$; in some of these embodiments, $\Delta 2(r)=0\%$. In some embodiments, the outer annular portion 60 has a substantially constant refractive index profile, as shown in FIG. 1 with a constant $\Delta 4(r)$; in some of these embodiments, $\Delta 4(r)=0\%$. The core 20 has an entirely positive refractive index profile, where $\Delta 1(r)>0\%$. $R_1$ is defined as the radius at which the refractive index delta of the core first reaches value of 0.05%, going radially outwardly from the centerline. Preferably, the core contains substantially no fluorine, and preferably the core contains no fluorine. In some embodiments, the inner annular portion 30 preferably has a relative refractive index profile $\Delta 2(r)$ having a maximum absolute magnitude less than 0.05%, and $\Delta 2_{MAX}<0.05\%$ and $\Delta 2_{MIN}>-0.05\%$, and the depressed-index annular portion 50 begins where the relative refractive index of the cladding first reaches a value of less than $-0.05\%$, going radially outwardly from the centerline. In some embodiments, the outer annular portion 60 has a relative refractive index profile $\Delta 4(r)$ having a maximum absolute magnitude less than 0.05%, and $\Delta 4_{MAX}<0.05\%$ and $\Delta 4_{MIN}>-0.05\%$, and the depressed-index annular portion 50 ends where the relative refractive index of the cladding first reaches a value of greater than $-0.05\%$, going radially outwardly from the radius where $\Delta 3_{MIN}$ is found.

In the multimode optical fiber disclosed herein, the core is a graded-index core, and preferably, the refractive index profile of the core has a parabolic (or substantially parabolic) shape; for example, in some embodiments, the refractive index profile of the core has an $\alpha$-shape with an $\alpha$ value preferably between 1.9 and 2.3, more preferably about 2.1, as measured at 850 nm; in some embodiments, the refractive index of the core may have a centerline dip, wherein the maximum refractive index of the core, and the maximum refractive index of the entire optical fiber, is located a small distance away from the centerline, but in other embodiments the refractive index of the core has no centerline dip, and the maximum refractive index of the core, and the maximum refractive index of the entire optical fiber, is located at the centerline. The parabolic shape extends to a radius $R_1$ and preferably extends from the centerline of the fiber to $R_1$. As used herein, "parabolic" therefore includes substantially parabolically shaped refractive index profiles which may vary slightly from an $\alpha$ value of about 2.0, for example 1.9, 2.1 or 2.3, preferably between 2.0 and 2.2, at one or more points in the core, as well as profiles with minor variations and/or a centerline dip. Referring to the Figures, the core 20 is defined to end at the radius $R_1$ where the parabolic shape ends, coinciding with the innermost radius of the cladding 200.

One or more portions of the clad layer 200 may be comprised of a cladding material which was deposited, for example during a laydown process, or which was provided in the form of a jacketing, such as a tube in a rod-in-tube optical preform arrangement, or a combination of deposited material and a jacket. The clad layer 200 is surrounded by at least one coating 210, which may in some embodiments comprise a low modulus primary coating and a high modulus secondary coating.

Preferably, the optical fiber disclosed herein has a silica-based core and cladding. In some embodiments, the cladding has an outer diameter, 2 times Rmax, of about 125 µm. Preferably, the outer diameter of the cladding has a constant diameter along the length of the optical fiber, wherein any fluctuations have a standard deviation not more than 1.0 µm. In some embodiments, the refractive index of the optical fiber has radial symmetry. Preferably, the outer diameter of the core has a constant diameter along the length of the optical fiber. In some embodiments, one or more coatings surround and are in contact with the cladding. The coating can be a polymer coating such as an acrylate-based polymer. In some embodiments, the coating has a constant diameter, radially and along the length of the fiber.

In some embodiments, the depressed-index annular portion comprises voids, either non-periodically disposed, or periodically disposed, or both. By "non-periodically disposed" or "non-periodic distribution", we mean that when one takes a cross section (such as a cross section perpendicular to the longitudinal axis) of the optical fiber, the non-periodically disposed voids are randomly or non-periodically distributed across a portion of the fiber. Similar cross sections taken at different points along the length of the fiber will reveal different cross-sectional hole patterns, i.e., various cross sections will have different hole patterns, wherein the distributions of voids and sizes of voids do not match. That is, the voids or voids are non-periodic, i.e., they are not periodically disposed within the fiber structure. These voids are stretched (elongated) along the length (i.e. parallel to the longitudinal axis) of the optical fiber, but do not extend the entire length of the entire fiber for typical lengths of transmission fiber. While not wishing to be bound by theory, it is believed that the voids extend less than a few meters, and in many cases less than 1 meter along the length of the fiber. Optical fiber disclosed herein can be made by methods which utilize preform consolidation conditions which are effective to result in a significant amount of gases being trapped in the consolidated glass blank, thereby causing the formation of voids in the consolidated glass optical fiber preform. Rather than taking steps to remove these voids, the resultant preform is used to form an optical fiber with voids, or voids, therein. As used herein, the diameter of a hole is the longest line segment whose endpoints are disposed on the silica internal surface defining the hole when the optical fiber is viewed in perpendicular cross-section transverse to the longitudinal axis of the fiber.

In some embodiments, the inner annular portion 30 comprises silica which is substantially undoped with either fluorine or germania. Preferably, the annular portion 30 comprises an inner radius of about 23 microns to 27 microns and an outer radius of less than 28 to 31 microns. Preferably, the annular portion 30 comprises a width of greater than about 0.5 and less than about 4 microns, more preferably greater than about 1.0 and less than about 3.0 microns, most preferably greater than about 1.0 and less than about 2.0 microns. In some embodiments, the outer annular portion 60 comprises substantially undoped silica, although the silica may contain some amount of chlorine, fluorine, germania, or other dopants in concentrations that collectively do not significantly modify the refractive index. In some embodiments, the depressed-index annular portion 50 comprises silica doped with fluorine. In some other embodiments, the depressed-index annular portion 50 comprises silica comprising a plurality of non-periodically disposed voids. The voids can contain one or more gases, such as argon, nitrogen, krypton, $CO_2$, $SO_2$, or oxygen, or the voids can contain a vacuum with substantially no gas; regardless of the presence or absence of any gas, the refractive index in the annular portion 50 is lowered due to the presence of the voids. The voids can be randomly or non-periodically disposed in the annular portion 50 of the cladding 200, and in other embodiments, the voids are disposed periodically in the annular portion 50. Alternatively, or in addition, the depressed index in annular portion 50 can also be provided by downdoping the annular portion 50 (such as with fluorine) or updoping one or more portions of the cladding and/or the core, wherein the depressed-index annular portion 50 is, for example, silica which is not doped as heavily as the inner annular portion 30. Preferably, the minimum relative refractive index, or average effective relative refractive index, such as taking into account the presence of any voids, of the depressed-index annular portion 50 is preferably less than −0.1%, more preferably less than about −0.2 percent, even more preferably less than about −0.3 percent, and most preferably less than about −0.4 percent.

In one set of embodiments, the multimode optical fiber comprises a graded-index, preferably parabolic (substantially parabolic), glass core 20 and glass cladding 200 as depicted in FIG. 1, wherein the core ends at a radius $R_1$, which marks the approximate end of the graded index core or parabolic shape. The core 20 is surrounded by and in direct contact with the inner annular portion 30, which has a substantially constant refractive index profile $\Delta 2(r)$. The inner annular portion 30 is surrounded by and in direct contact with the depressed-index annular portion 50, and the depressed-index annular portion 50 is surrounded by and in direct contact with the outer annular portion 60, which has a substantially constant refractive index profile $\Delta 4(r)$. The depressed-index annular portion 50 may comprise a plurality of voids. In some of this set of embodiments, the core 20 comprises germania doped silica, the inner annular portion 30 comprises pure silica, and the outer annular portion 60 comprises pure silica; in some of these embodiments, the depressed-index annular portion 50 comprises hole-free fluorine-doped silica; in others of these embodiments, the depressed-index annular portion 50 comprises a plurality of voids in pure silica; and in yet others of these embodiments, the depressed-index annular portion 50 comprises a plurality of voids in fluorine-doped silica. In embodiments where the inner annular portion 30 comprises pure silica and the depressed-index annular portion 50 comprises pure silica with a plurality of voids, the depressed-index annular portion 50 starts at the innermost radius of the innermost hole. In embodiments where the outer annular portion 60 comprises pure silica, and the depressed-index annular portion 50 comprises pure silica with a plurality of voids, the depressed-index annular portion 50 ends at the outermost radius of the outermost hole.

The numerical aperture (NA) of the optical fiber is preferably greater than the NA of the optical source directing signals into the fiber; for example, the NA of the optical fiber is preferably greater than the NA of a VCSEL source.

FIG. 2 is a schematic representation (not to scale) of a cross-sectional view of an optical waveguide fiber 100 as disclosed herein having core 20 and a cladding 200 directly adjacent and surrounding the core 20, the cladding 200 being comprised of an inner annular portion 30, a depressed-index annular portion 50, and an outer annular portion 60.

Referring to FIG. 1 as one exemplary depiction of a refractive index profile of a multimode optical fiber disclosed herein, the cladding 200 comprises: an inner annular portion 30 surrounding the core 20 and directly adjacent thereto, and extending radially outwardly to an inner annular portion outer radius, $R_2$, and having a width $W_2$ disposed at a midpoint $R_{2MID}$, the portion 30 having a relative refractive index profile, $\Delta_2(r)$ in %, with a maximum relative refractive index percent, $\Delta_{2MAX}$, in %, a minimum relative refractive index percent, $\Delta_{2MIN}$, in %, and a maximum absolute magnitude relative refractive index percent, $|\Delta_2(r)|_{MAX}$; a depressed-index annular portion (or "ring") 50 surrounding portion 30 and directly adjacent thereto, and extending radially outwardly from $R_2$ to a depressed-index annular portion radius, $R_3$, the portion 50 having a width $W_3$ disposed at a midpoint $R_{3MID}$, and having a relative refractive index profile, $\Delta_3(r)$ in %, with a minimum relative refractive index percent, $\Delta_{3MIN}$, in %, wherein $\Delta_{1MAX} > 0 > \Delta_{3MIN}$; and an outer annular portion 60 surrounding the portion 50 and directly adjacent thereto and having a relative refractive index percent, $\Delta_4(r)$ in %. $R_1$ is defined as the radius at which the refractive index delta of the core first reaches value of 0.05%, going radially outwardly from the centerline. That is, core 20 ends and the annular inner portion 30 starts at a radius R1, and portion 30 is defined to end at a radius R2. The depressed-index annular portion 50 begins at $R_2$ and ends at $R_3$. The width $W_3$ of the annular portion 50 is $R_3 - R_2$ and its midpoint $R_{3MID}$ is $(R_2 + R_3)/2$. In some embodiments, $|\Delta_2(r)| < 0.025\%$ for more than 50% of the radial width of the annular inner portion 30, and in other embodiments $|\Delta_2(r)| < 0.01\%$ for more than 50% of the radial width of the annular inner portion 30. Cladding 200 extends to a radius, $R_4$, which is also the outermost periphery of the glass part of the optical fiber. In some embodiments, $R_4 > 40$ μm; in other embodiments, $R_4 > 50$ μm, and in other embodiments, $R_4 > 60$ μm, and in some embodiments, $60$ μm $< R_4 < 70$ μm.

In some embodiments, $W_3$ is greater than 0.5 and less than 10 μm, more preferably greater than 1.0 μm and less than 8 μm, even more preferably greater than 2 μm and less than 6 μm.

Set forth below in Table 1 are a variety of modeled examples in accordance with the present invention.

TABLE 1

|  | Example 1 | Example 2 | Example 3 | Example 4 |
|---|---|---|---|---|
| $\Delta 1_{MAX}$ (%) | 1.01 | 1.01 | 1.01 | 1.01 |
| R1 (μm) | 25 | 25 | 25 | 25 |
| Alpha | 2.096 | 2.096 | 2.096 | 2.096 |
| $\Delta_2$ (%) | 0 | 0 | 0 | 0 |
| R2 (μm) | 25.9 | 26.3 | 26.5 | 26.7 |
| W2 (μm) | 0.9 | 1.3 | 1.5 | 1.7 |
| $\Delta_{3MIN}$ (%) | −0.2 | −0.4 | −0.6 | −1.3 |
| R3 (μm) | 29.25 | 29.25 | 29.25 | 29.25 |
| W3 (μm) | 3.35 | 2.95 | 2.75 | 2.55 |
| $\Delta_4$ (%) | 0 | 0 | 0 | 0 |
| R4 (μm) | 62.5 | 62.5 | 62.5 | 62.5 |
| Peak Bandwidth at 850 nm (MHz-km) | 18600 | 18800 | 18700 | 19200 |

Set forth below in Table 2 are a variety of example optical fibers made in accordance with the present invention, as well as measured properties for each fiber.

TABLE 2

|  | Example 5 | Example 6 | Example 7 | Example 8 |
|---|---|---|---|---|
| $\Delta 1_{MAX}$ (%) | 1.1 | 1.05 | 1.08 | 1.1 |
| R1 (μm) | 25 | 25.1 | 24.25 | 24 |
| Alpha | 2.1 | 2.12 | 2.12 | 2.12 |
| $\Delta_2$ % | 0.008 | 0 | 0.012 | 0 |
| R2 (μm) | n/a | n/a | 26.75 | 26.25 |
| W2 (μm) | 0 | 0 | 2.5 | 2.25 |
| $\Delta_{3MIN}$ (%) | 0 | −0.85 | −0.85 | −0.33 |
| R3 (μm) | n/a | 28 | 29.75 | 30.25 |
| W2 (μm) | 0 | 3 | 3 | 4 |
| $\Delta_4$ (%) | 0 | 0 | 0 | 0 |
| R4 (μm) | 62.5 | 62.5 | 62.5 | 62.5 |
| OFL Bandwidth at 850 nm (MHz-km) | 1170 | 343 | 1451 | 1590 |
| Minimum EMBc Bandwidth at 850 nm (MHz-km) | 1087 | 516 | 1581 | 1816 |
| OFL Bandwidth at 1300 nm (MHz-km) | 880 | 158 | 669 | 474 |
| 1 × 30 mm macrobend (dB) | 0.088 | 0.003 | 0.073 | 0.006 |
| 1 × 20 mm macrobend (dB) | 0.209 | 0.013 | 0.121 | 0.015 |

TABLE 2-continued

| | Example 5 | Example 6 | Example 7 | Example 8 |
|---|---|---|---|---|
| 1 × 10 mm macrobend (dB) | 0.807 | 0.104 | 0.445 | 0.109 |
| 1 × 6 mm macrobend (dB) | n/a | n/a | 2.26 | 0.57 |

Example 5

Comparative

Corning Incorporated InfiniCor® optical fiber having a core diameter of 50 μm and a 125 micron glass fiber diameter was fabricated comprising a 50 micron diameter core of $GeO_2$—$SiO_2$ graded index (1% maximum Δ relative to the pure silica cladding with a parabolic (α=2.1) shape) and a solid silica cladding (with no depressed annular region).

Example 6

Comparative 2200 grams of $SiO_2$ (0.36 g/cc density) soot were flame deposited onto a 1 meter long×24.8 mm diameter solid glass cane of $GeO_2$—$SiO_2$ graded index core (1% maximum refractive index relative to pure silica with a parabolic (α=2.1) shape). This assembly was then sintered as follows. The assembly was first dried for 2 hours in an atmosphere consisting of helium and 3 percent chlorine at 1000° C. followed by down driving at 32 mm/in through a hot zone set at 1500° C. in an atmosphere comprising 50 percent nitrogen and 50 percent helium, then re-down-driven through the hot zone at 25 mm/min in the same atmosphere, then final sintered in an atmosphere comprising 50 percent nitrogen and 50 percent helium at 6 mm/min, in order to sinter the soot to an "nitrogen-seeded" first overclad preform comprising a void-free $GeO_2$—$SiO_2$ graded index core surrounded by a "nitrogen-seeded" cladding layer. The preform was placed for 24 hours in an argon purged holding oven set at 1000° C. The preform was then placed on a lathe where 5910 grams of $SiO_2$ soot were flame deposited onto the 1 meter long cane. This assembly was then sintered as follows. The assembly was first dried for 2 hours in an atmosphere consisting of helium and 3 percent chlorine at 1000° C. followed by down driving at 6 mm/min through a hot zone set at 1500° C. in a 100 percent helium atmosphere, in order to sinter the soot to an optical preform comprising a void-free $GeO_2$—$SiO_2$ graded index core, a "nitrogen-seeded" first cladding layer and a void-free silica outer cladding. The preform was placed for 24 hours in an argon purged holding oven set at 1000° C. The preform was drawn to an 8.8 km length of 125 micron diameter fiber at 10 m/s using a draw furnace having a hot zone of about 8 cm length and set at approximately 2000° C. The measured OFL bandwidths of this fiber were 516 and 158 MHz-km at 850 and 1300 mm, respectively. The low bandwidths are due to the absence of an inner annular region between the graded index core and the depressed annular region.

Example 7

320 grams of $SiO_2$ (0.36 g/cc density) soot were flame deposited onto a 1 meter long×28 mm diameter solid glass cane with a core/clad (clad=cane diameter) ratio of 0.93 and comprising a $GeO_2$—$SiO_2$ graded index core (1% maximum refractive index relative to pure silica with a parabolic (α=2.1) shape) and a silica first cladding layer. This assembly was then sintered as follows. The assembly was first dried for 2 hours in an atmosphere consisting of helium and 3 percent chlorine at 1000° C. followed by down driving at 32 min/min through a hot zone set at 1500° C. in an atmosphere comprising 50 percent nitrogen and 50 percent helium, then re-down-driven through the hot zone at 25 mm/min in the same atmosphere, then final sintered in an atmosphere comprising 50 percent nitrogen and 50 percent helium at 6 mm/min, in order to sinter the soot to form a "nitrogen-seeded" preform comprising a void-free $GeO_2$—$SiO_2$ graded index core, a silica first cladding layer and a "nitrogen-seeded" second cladding layer. The preform was placed for 24 hours in an argon purged holding oven set at 1000° C. The preform was drawn into a 1 meter×24.9 mm diameter cane, which was then placed on a lathe where 3525 grams of $SiO_2$ soot were flame deposited. This assembly was then sintered as follows. The assembly was first dried for 2 hours in an atmosphere consisting of helium and 3 percent chlorine at 1000° C. followed by down driving at 6 mm/min through a hot zone set at 1500° C. in a 100 percent helium atmosphere, in order to sinter the soot to an optical preform comprising void-free $GeO_2$—$SiO_2$ graded index core, a silica first cladding layer, a "nitrogen-seeded" second cladding layer and a void-free silica outer cladding. The preform was placed for 24 hours in an argon purged holding oven set at 1000° C. The preform was drawn to a 8.8 km length of 125 micron diameter fiber at 10 m/s using a draw furnace having a hot zone of about 8 cm length and set at approximately 2000° C. SEM image analysis at 900 and 4000 fold magnification of the end face of these fibers showed an approximate 24.3 micron radius void-free solid silica-germania core 20 surrounded by a approximate 26.8 micron outer radius void-free solid silica containing inner annular portion 30 surrounded by a approximate 29.8 micron outer radius void-containing depressed index annular portion 50 (total ring thickness, $W_3$, of approximately 3 microns radially) comprising approximately 200 voids in region 50 of approximately 0.2 micron mean diameter with the maximum, minimum and standard deviation of approximately 0.4, 0.03 and 0.07 microns respectively, which is surrounded by a void-free silica outer annular cladding portion 60 having an outer diameter of about 125 microns (all radial dimensions measured from the center of the optical fiber). The overall void containing ring region comprised about 1 percent regional area percent holes (100 percent $N_2$ by volume). The total fiber void area percent (area of the holes divided by total area of the optical fiber cross-section×100) was about 0.06 percent.

Example 8

427 grams of $SiO_2$ (0.36 g/cc density) soot were flame deposited onto a 1 meter long×27.5 mm diameter solid glass cane comprising a $GeO_2$—$SiO_2$ graded index core (1% maximum refractive index relative to pure silica with a parabolic (α=2.1) shape) with a silica inner cladding layer and a core/clad (clad=cane diameter) ratio of 0.95. This assembly was then sintered as follows. The assembly was first dried for 2 hours in an atmosphere consisting of helium and 3 percent chlorine at 1125° C. followed by fluorine doping the soot preform in an atmosphere consisting of helium and 20 percent $SiF_4$ at 1125° C. for 4 hours then down driving at 14 mm/min through a hot zone set at 1480° C. in a 100 percent helium atmosphere in order to sinter the soot to an overclad preform comprising a germania-silica graded index core, a silica inner cladding, and a fluorine-doped second cladding layer. The preform was drawn into a 1 meter×25.0 mm diameter cane, which was then placed on a lathe where 3538 grams of SiO$_2$ soot were flame deposited. This assembly was then sintered as follows. The assembly was first dried for 2 hours in an atmosphere consisting of helium and 3 percent chlorine at 1000° C. followed by down driving at 6 mm/min through a hot zone set at 1500° C. in a 100 percent helium atmosphere, in order to sinter the soot to a void-free optical preform comprising a GeO$_2$—SiO$_2$ graded index core, a silica first cladding layer, a fluorine-doped second cladding layer and a silica outer cladding. The preform was placed for 24 hours in an argon purged holding oven set at 1000° C. The preform was drawn to an 8.8 km length of 125 micron diameter fiber at 10 m/s using a draw furnace having a hot zone of about 8 cm length and set at approximately 2000° C.

Figure 3:
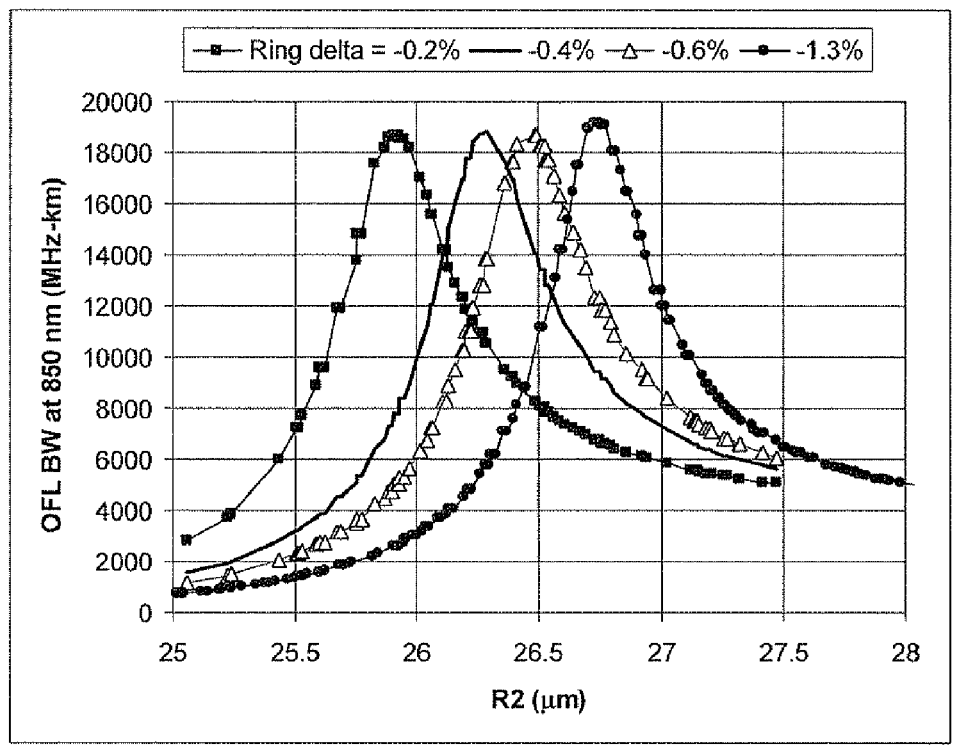
FIG. 3 illustrates modeled OFL bandwidth at 850 nm for a variety of fibers made in accordance with some embodiments of the invention.

FIG. 3 illustrates modeled OFL bandwidth at 850 nm for a variety of fibers made in accordance with some embodiments of the invention. Each of the fibers illustrated in FIG. 3 correspond to the fibers set forth in Table 1 above. As can be seen in FIG. 3, a peak OFL bandwidth at 850 nm higher than 6000, more preferably higher than 8000, even more preferably higher than 8000, and even as high as greater than 18000 MHz-km can be achieved using these fiber designs. Furthermore, these examples illustrate that these high bandwidths are achieved when the annular portion 30 comprises a width W$_2$ greater than about 0.5 and less than about 4 microns, more preferably greater than about 0.75 and less than about 3.0 microns, even more preferably greater than about 1.0 and less than about 3.0 microns, most preferably greater than about 1.0 and less than about 2.0 microns.

Figure 4:
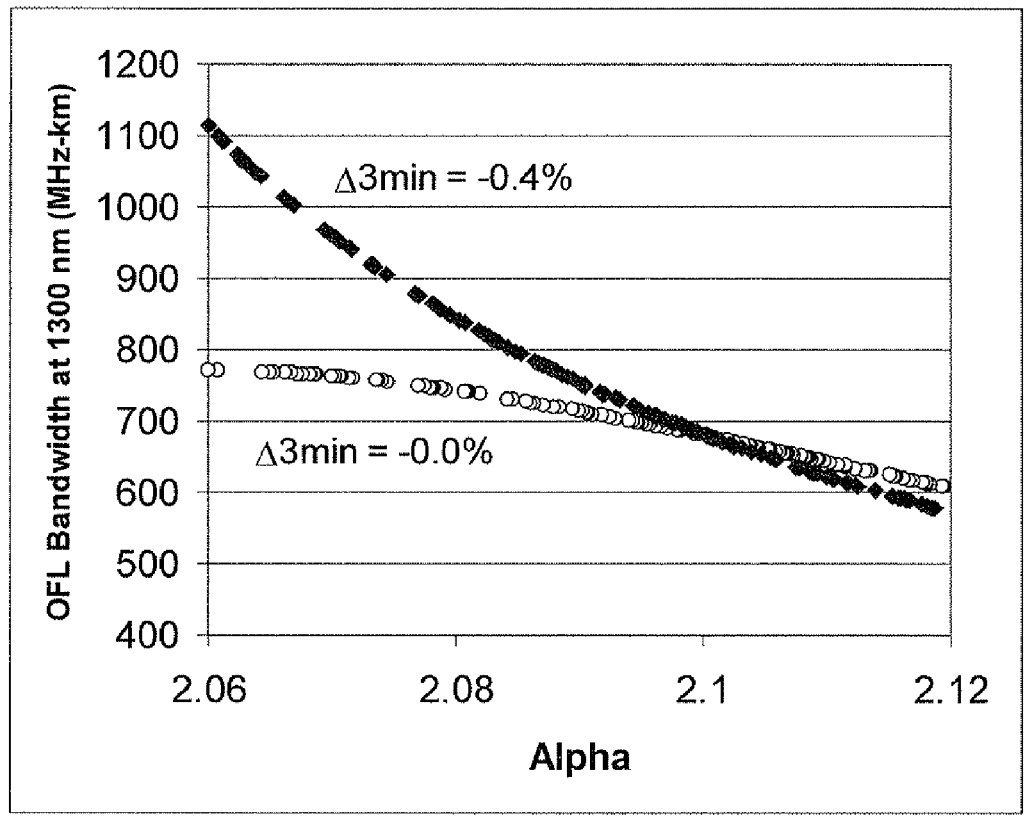
FIG. 4 illustrates modeled OFL bandwidth at 1300 nm for a prior art fiber and a fiber made in accordance with some embodiments of the invention.

FIG. 4 illustrates modeled OFL bandwidth at 1300 nm versus core alpha for a prior art fiber and a fiber made in accordance with some embodiments of the invention. The addition of the depressed annular ring results in a higher OFL bandwidth at 1300 nm compared to a comparative fiber without a depressed annular region.

Figure 5:
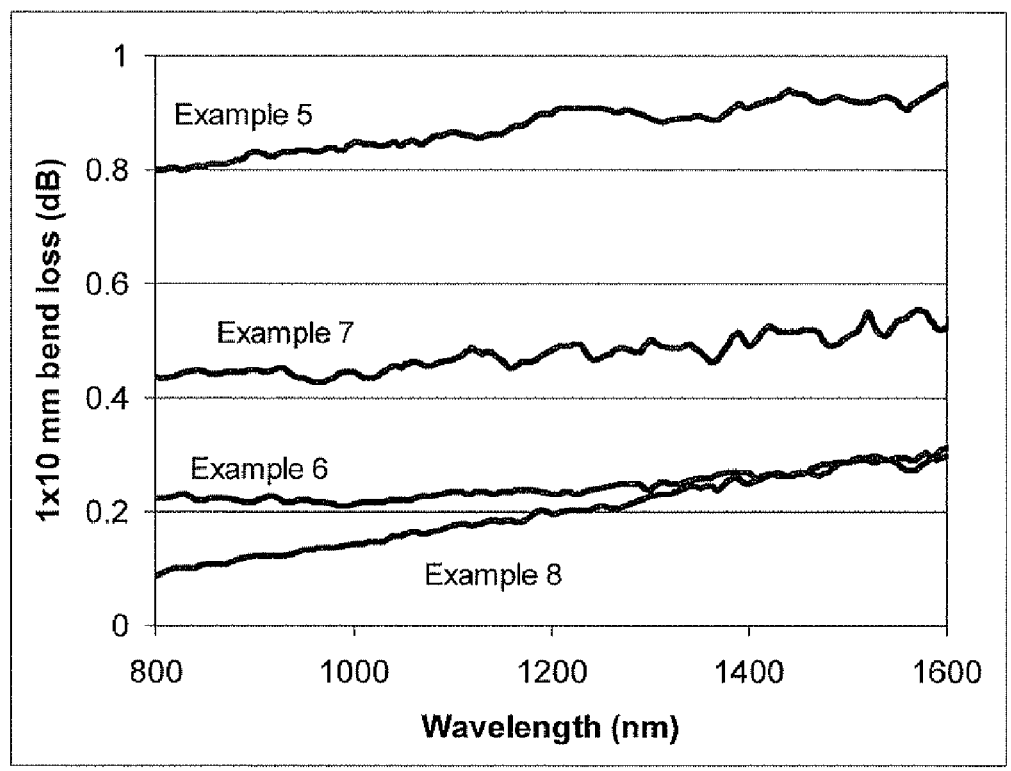
FIG. 5 illustrates 1×10 mm bend loss as a function of wavelength for a prior art fiber and fibers made in accordance with some embodiments of the invention.

FIG. 5 illustrates 1×10 mm bend loss as a function of wavelength for a prior art fiber (Example 5) and three fibers set forth in Table 2 which were made in accordance with various embodiments of the invention. As can be seen in FIG. 5, fibers having a 1×10 mm bend loss less than 0.6 dB, more preferably less than 0.4, and even more preferably less than about 0.3 dB have been achieved across the entire bandwidth region from 800 to 1400 nm. At 850 nm, the attenuation increase with a 1 turn 10 mm diameter mandrel wrap is less than 0.5 dB, more preferably less than 0.3 dB, even more preferably less than 0.2 dB, and most preferably less than 0.15 dB.

Figure 6:
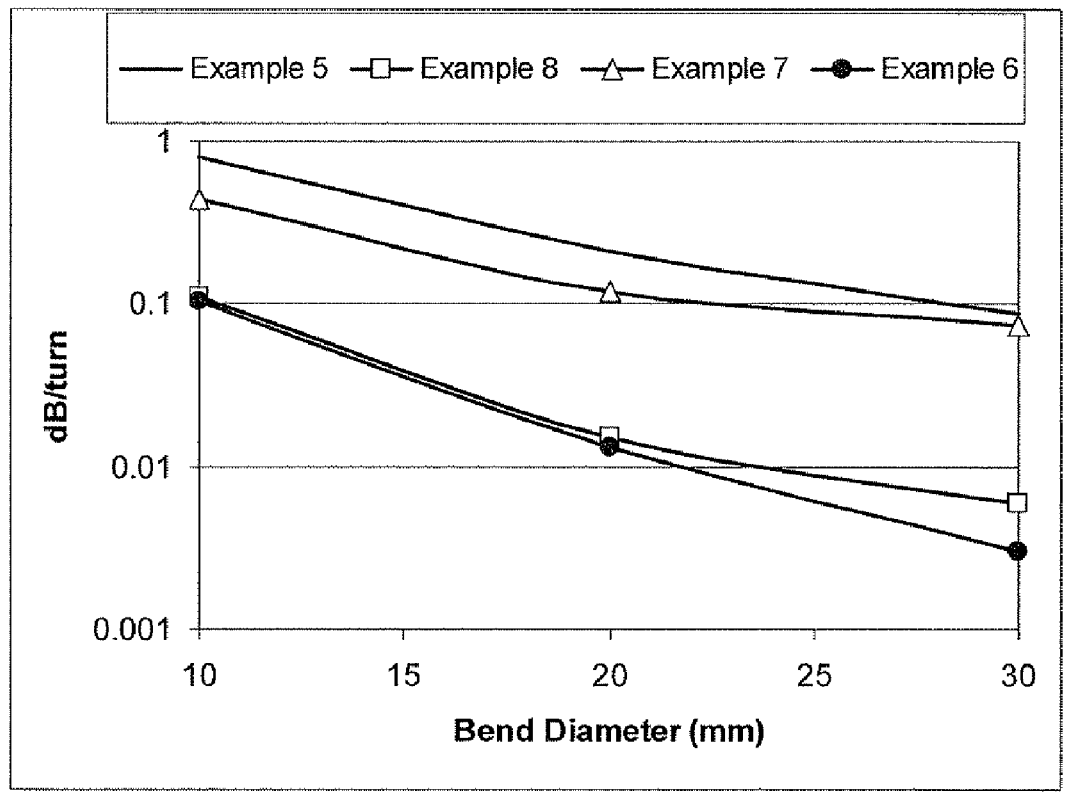
FIG. 6 illustrates attenuation loss per turn vs. bend diameter for a prior art fiber and several fibers made in accordance with some embodiments of the invention.

FIG. 6 illustrates attenuation loss at 850 nm per turn vs. bend diameter for a prior art fiber (Example 5) and three fibers set forth in Table 2 which were made in accordance with various embodiments of the invention. As can be seen in FIG. 6, fibers were made which exhibited a bend loss less than or equal to about 0.1 dB/turn at 10 mm diameter, less than 0.05 dB/turn at 20 mm diameter, and less than 0.01 dB/turn at 30 mm diameter.

Examples 9 and 10

71.3 grams of SiO$_2$ (0.36 g/cc density) soot were flame deposited onto a 1 meter long×26.0 mm diameter solid glass core cane comprising a GeO$_2$—SiO$_2$ graded index core glass (0.95% maximum refractive index relative to pure silica with a parabolic (Δ=2.1) shape). This assembly was then sintered as follows. The assembly was first dried for 2 hours in an atmosphere consisting of helium and 3 percent chlorine at 1000° C. followed by down driving at 6 mm/min through a hot zone set at 1500° C. in a 100 percent helium atmosphere, in order to sinter the soot to an optical preform comprising a void-free GeO$_2$—SiO$_2$ graded index core and a silica first cladding layer with a core/clad (clad=outer diameter of cane after silica deposition and sintering) ratio of 0.96. This optical preform was drawn into a 1 meter long cane with an outer diameter of 20.1 mm. 246 grams of SiO$_2$ (0.36 g/cc density) soot were then flame deposited onto the 1 meter long×20.1 mm diameter solid glass cane comprising a GeO$_2$—SiO$_2$ graded index core (0.95% maximum refractive index relative to pure silica with a parabolic (α=2.1) shape) with a silica inner cladding layer and a core/clad (clad=cane diameter) ratio of 0.96. This assembly was then sintered as follows. The assembly was first dried for 2 hours in an atmosphere consisting of helium and 3 percent chlorine at 1125° C. followed by fluorine doping the soot preform in an atmosphere consisting of helium and 20 percent SiF$_4$ at 1125° C. for 4 hours then down driving at 14 mm/min through a hot zone set at 1480° C. in a 100 percent helium atmosphere in order to sinter the soot to an overclad preform comprising a germania-silica graded index core, a silica inner cladding, and a fluorine-doped second cladding layer. The preform was then placed on a lathe where 2892 grams of SiO$_2$ soot were flame deposited. This assembly was then sintered as follows. The assembly was first dried for 2 hours in an atmosphere consisting of helium and 3 percent chlorine at 1000° C. followed by down driving at 6 mm/min through a hot zone set at 1500° C. in a 100 percent helium atmosphere, in order to sinter the soot to a void-free optical preform comprising GeO$_2$—SiO$_2$ graded index core, a silica first cladding layer, a fluorine-doped second cladding layer and a void-free silica outer cladding. The preform was placed for 24 hours in an argon purged holding oven set at 1000° C. The preform was drawn to an 8.8 km length of 125 micron diameter fiber at 10 m/s using a draw furnace having a hot zone of about 8 cm length and set at approximately 2000° C. A near field measurement of the optical fiber verified that the refractive index profile is comprised of a graded index core with a radius R1=25.4 μm and a maximum refractive index $\Delta 1_{MAX}$=0.95%, an inner cladding layer with R2=26.4 nm, $\Delta 2_{MIN}$>−0.05% and $\Delta 2_{MAX}$<0.05%, a depressed annular region with R3=31.6 μm, $\Delta 3_{MIN}$=−0.4% and a volume V3=−121%-μm$^2$, and a silica outer cladding with R4=62.5 μm and an average refractive index of 0.0%.

Table 3 illustrates the actual measured optical properties of the fiber described in Example 9 and an additional fiber (Example 10) made according to the invention. Example 10 was made using a process similar to that disclosed above for Example 9, except where noted. These examples illustrate that high bandwidths and low bend losses can be achieved when the annular portion 30 comprises a width W$_2$ greater than about 0.5 and less than about 4 microns, more preferably greater than about 1.0 and less than about 3.0 microns, most preferably greater than about 1.0 and less than about 2.0 microns.

TABLE 3

|  | Example 9 | Example 10 |
|---|---|---|
| Δ1% | 0.95 | 0.94 |
| Δ3MIN % | −0.4 | −0.44 |
| R1 (μm) | 25.4 | 25.3 |
| R2 (μm) | 26.4 | 26.5 |
| R3 (μm) | 31.6 | 31.3 |
| W2 (μm) | 1.0 | 1.2 |
| W3 (μm) | 5.18 | 4.77 |
| V3 (%-μm2) | −121.2 | −115.8 |
| Attenuation at 850 nm (dB/km) | 2.198 | 2.184 |
| Attenuation 1300 nm (dB/km) | 0.437 | 0.411 |

TABLE 3-continued

|  | Example 9 | Example 10 |
|---|---|---|
| Numerical Aperture | 0.2026 | 0.1962 |
| Overfilled Bandwidth at 850 (MHz-km) | 2849 | 2591 |
| Minimum effective modal bandwidth (MHz-km) | 3854 | 2319 |
| Overfilled Bandwidth at 1300 (MHz-km) | 765 | 664 |
| 10 mm macrobend at 850 nm (dB/turn) | 0.061 | 0.096 |
| 15 mm macrobend at 850 nm (dB/turn) | 0.014 | 0.036 |
| 20 mm macrobend at 850 nm (dB/turn) | 0.007 | 0.023 |

Set forth below in Table 4 are a variety of modelled fiber examples in accordance with the present invention. These examples illustrate that high bandwidths and low bend losses are achieved when the annular portion 30 comprises a width $W_2$ greater than about 0.5 and less than about 4 microns, more preferably greater than about 1.0 and less than about 3.0 microns. The 1×10 mm macrobend loss is less than 0.6 dB, more preferably less than 0.4, and even more preferably less than about 0.3 dB across the entire bandwidth region from 800 to 1400 nm. At 850 nm, the attenuation increase with a 1 turn 10 mm diameter mandrel wrap is less than 0.5 dB, more preferably less than 0.3 dB, even more preferably less than 0.2 dB, and most preferably less than 0.15 dB. The 1×15 mm macrobend loss is less than 0.2 dB, preferably less than 0.1 dB, and more preferably less than 0.06 dB.

Figure 7:
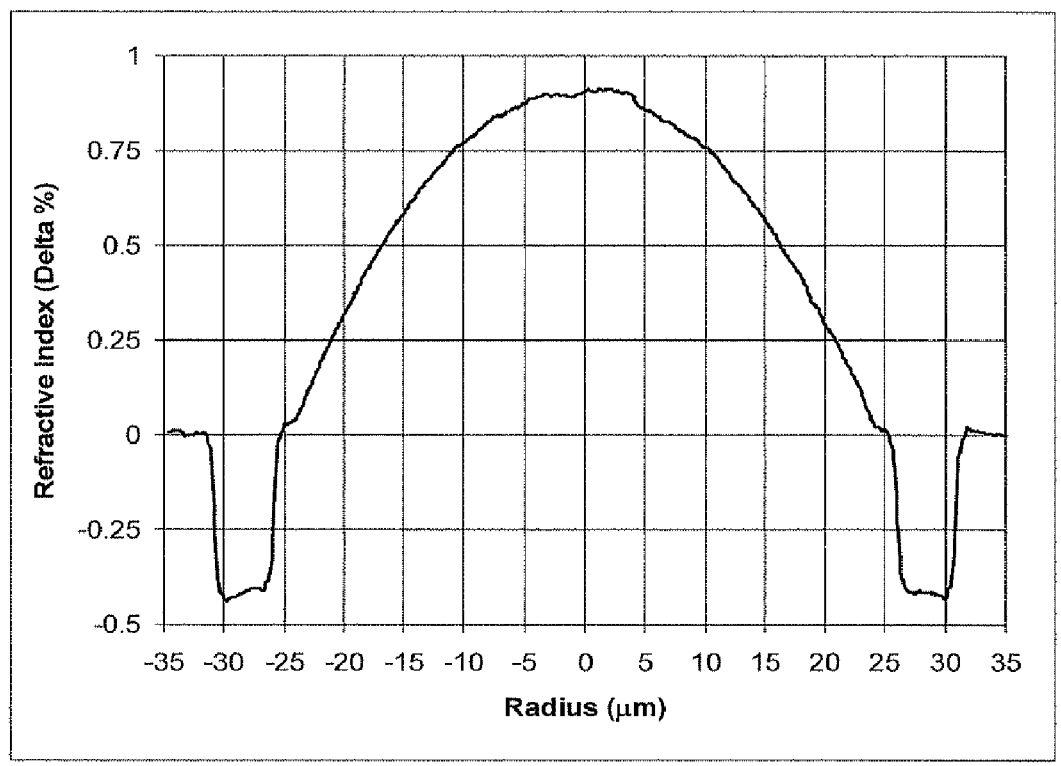
FIG. 7 shows a refractive index profile, measured using refractive near field measurement, of a cross-section of the glass portion of an exemplary embodiment of multimode optical fiber disclosed herein wherein the depressed-index annular portion is offset from the core and is surrounded by an outer annular portion.
Figure 8:
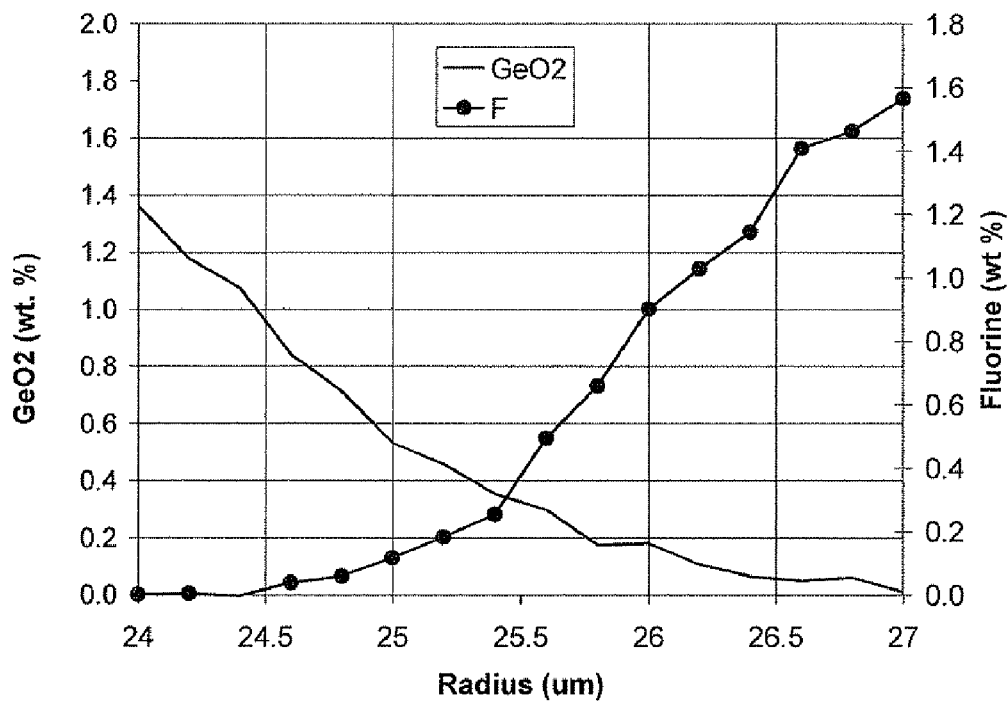
FIG. 8 illustrates measured microprobe results of the inner cladding region of the optical waveguide fiber of FIG. 1 showing the fluorine and germanium concentrations between 24 and 27 μm.

The examples in Table 4 also illustrate that a reduction in the maximum refractive index of the central core enables very high bandwidths at 850 and 1300 nm while maintaining a numerical aperture greater than 0.14, more preferably greater than 0.15, even more preferably greater than 0.16 and most preferably greater than 0.185. In some preferred embodiments, the numerical aperture is greater than 0.185 and less than 0.215. The overfilled bandwidth at 850 nm is greater than 5000 MHz-km, preferably greater than 10000 MHz-km, more preferably greater than 20000 MHz-km and even more preferably greater than 40000 MHz-km. The overfilled bandwidth at 1300 nm is greater than 500 MHz-km, preferably greater than 700 MHz-km, and more preferably greater than 1000 MHz-km.

core has an outer radius R1 between 23 and 26 microns and the inner annular portion comprises a width of greater than 0.5 microns and less than 3 microns. The inner annular portion comprises a peak fluorine concentration greater than 0.2 wt percent and a peak germania concentration greater than 0.2 wt percent. The depressed annular portion comprises a depressed-index having a refractive index delta less than about −0.2% and a width of at least 1 micron. However, the invention is not limited to this design, and it should be understood that modifications to this embodiment could include any of the modifications disclosed hereinabove. The depressed index annular cladding region of the fiber illustrated in FIG. 7 is fluorine doped, and contains no voids therein. As can be seen in FIG. 7, in this embodiment, the inner annular portion 30 in this particular fiber comprises a peak fluorine concentration in said inner annular portion greater than 0.3 wt percent and a peak germania concentration in said inner annular portion greater than 0.3 wt percent. This inner annular region also exhibits a region of increasing fluorine concentration and decreasing germania concentration as radius increases. The germania concentration in the fiber is preferably less than 2 wt. %, more preferably less than 1 wt. % at a radius of 25 microns. The germania concentration in said fiber preferably less than 0.5 wt. %, more preferably less than 0.3 wt. % at a radius of 26.0 microns. The fluorine concentration in said fiber is preferably less than 2 wt. %, more preferably less than 1.5 wt. %, and even more preferably less than 1 wt. % at a radius of 26.0 microns. The fluorine concentration is preferably greater than 0.1 wt. %, more preferably greater than 0.2 wt. %, and even more preferably greater than 0.4% at a radius of 26.0 microns. Also, at the midpoint of said inner annular portion, the region comprises greater than 0.1 wt percent fluorine and greater than 0.1 wt percent germania.

It is to be understood that the foregoing description is exemplary of the invention only and is intended to provide an overview for the understanding of the nature and character of the invention as it is defined by the claims. The accompanying

TABLE 4

|  | Example 11 | Example 12 | Example 13 | Example 14 | Example 15 |
|---|---|---|---|---|---|
| Δ1% | 0.936 | 0.84 | 0.75 | 0.66 | 0.58 |
| Core Alpha | 2.1006 | 2.1002 | 2.1015 | 2.1021 | 2.1021 |
| Δ3MIN % | −0.4 | −0.4 | −0.4 | −0.45 | −0.45 |
| R1 (μm) | 25 | 25 | 25 | 25 | 25 |
| R2 (μm) | 26.71 | 26.75 | 26.88 | 27.03 | 27.14 |
| R3 (μm) | 30.6 | 30.7 | 31.4 | 30.94 | 31.5 |
| W2 (μm) | 1.71 | 1.75 | 1.88 | 2.03 | 2.14 |
| W3 (μm) | 3.89 | 3.95 | 4.52 | 3.91 | 4.36 |
| V3 (%-μm2) | −89 | −91 | −105 | −102 | −115 |
| Numerical Aperture | 0.201 | 0.190 | 0.179 | 0.168 | 0.157 |
| Overfilled Bandwidth at 850 (MHz-km) | 22634 | 30081 | 35796 | 50386 | 67469 |
| Overfilled Bandwidth at 1300 (MHz-km) | 731 | 874 | 1063 | 1070 | 1343 |
| 10 mm macrobend at 850 nm (dB/turn) | 0.103 | 0.110 | 0.127 | 0.133 | 0.146 |
| 15 mm macrobend at 850 nm (dB/turn) | 0.040 | 0.043 | 0.049 | 0.052 | 0.057 |

FIG. 7 illustrates measured microprobe results of the inner annular portion 30 region of a fiber having an index profile as described above with respect to FIG. 1. The example illustrated in FIG. 7 is a multimode fiber comprising a graded index core, and a cladding surrounding said core, wherein the cladding comprises an inner annular portion and a depressed annular portion surrounding the inner annular portion. The drawings are included to provide a further understanding of the invention and are incorporated and constitute part of this specification. The drawings illustrate various features and embodiments of the invention which, together with their description, serve to explain the principals and operation of the invention. It will become apparent to those skilled in the art that various modifications to the preferred embodiment of the invention as described herein can be made without departing from the spirit or scope of the invention as defined by the appended claims.

What is claimed is:

1. A multimode optical fiber comprising:
a glass core having a parabolic graded index; and
an inner cladding surrounding and in contact with the core, the inner cladding having a refractive index which departs from the parabolic index of the core, the core having an outer radius between 20 and 40 micron and an alpha between 1.9 and 2.3, and a second cladding comprising a depressed-index annular portion surrounding the inner cladding, said depressed-index annular portion having a refractive index delta less than about −0.3% and a width of at least 1 micron, wherein the width of said inner cladding is at least 0.5 microns and less than 4 microns, and said fiber exhibits an OFL bandwidth of greater than 3.0 GHz-km, and a 1 turn 20 mm diameter mandrel wrap attenuation increase, of less than or equal to 0.1 dB/turn at 850 nm.

2. The optical fiber of claim 1, wherein said inner cladding has a refractive index delta greater than −0.05% and less than 0.05% and comprises an inner radius of about 25 microns and the width of said inner cladding is at least 1 micron.

3. The optical fiber of claim 1, wherein the width of said inner cladding is less than 3 microns and the refractive index of the inner cladding is substantially constant.

4. The fiber of claim 1, wherein said fiber further exhibits a 1 turn 10 mm diameter mandrel wrap attenuation increase of less than or equal to 1.0 dB/turn at 850 nm.

5. The fiber of claim 1, wherein said fiber further exhibits a 1 turn 10 mm diameter mandrel wrap attenuation increase, of less than or equal to 0.5 dB/turn at 850 nm.

6. The fiber of claim 2, wherein said depressed-index annular portion has a width greater than 2 microns.

7. The fiber of claim 6, wherein said depressed-index annular portion has a width less than 10 microns.

8. The fiber of claim 1, wherein said fiber further exhibits an overfilled bandwidth greater than 4.0 GHz-km at 850 nm.

9. The fiber of claim 1, wherein said depressed-index annular portion exhibits a refractive index delta less than −0.3 percent.

10. The fiber of claim 1, wherein said depressed-index annular portion exhibits a refractive index delta less than −0.4 percent.

11. The fiber of claim 1, wherein said depressed-index annular portion comprises fluorine doped silica.

12. The fiber of claim 1, wherein said depressed-index annular portion comprises a plurality of non-periodically disposed voids.

13. The fiber of claim 1 wherein the maximum refractive index delta of the graded index glass core is greater than 0.5% and less than 1.2%.

14. The fiber of claim 1 wherein the 1 turn 10 mm diameter attenuation increase is less than 0.6 dB for all wavelengths between 800 and 1400 nm.

15. A multimode optical fiber comprising:
a glass core having a parabolic graded index; and
an inner cladding surrounding and in contact with the core, the inner cladding having a refractive index which departs from the parabolic index of the core, and a second cladding comprising a depressed-index annular portion surrounding the inner cladding, said depressed-index annular portion having a refractive index delta less than about −0.3% and a width of at least 1 micron, wherein the width of said inner cladding is at least 0.5 microns and said fiber further exhibits a 1 turn 10 mm diameter mandrel wrap attenuation increase, of less than or equal to 0.4 dB/turn at 850 nm, and an overfilled bandwidth greater than 1.5 GHz-km at 850 nm and said fiber exhibits an OFL bandwidth of greater than 3.0 GHz-km.

16. The multimode fiber of claim 15 further comprising a numerical aperture of greater than 0.18.

17. The multimode fiber of claim 15, wherein said depressed-index annular portion comprises fluorine.

18. The multimode fiber of claim 15, wherein said fiber further exhibits an overfilled bandwidth greater than 4.0 GHz-km at 850 nm.

19. The multimode fiber of claim 1 further comprising a numerical aperture of greater than 0.14.

20. A multimode fiber comprising a core having a parabolic graded index, and a cladding surrounding said core, said cladding comprising an inner annular region, the annular region having a refractive index which departs from the parabolic index of the core, and a depressed annular region surrounding the inner annular region, wherein the core has an outer radius R1 between 23 and 26 microns and said inner annular region comprises a width of greater than 0.5 microns and less than 3 microns, said inner annular region comprising a peak fluorine concentration greater than −0.3 wt percent and a peak germania concentration greater than 0.2 wt percent, said depressed annular region comprising a depressed-index having a refractive index delta less than about −0.2% and a width of at least 1 micron, and said fiber exhibits an OFL bandwith of greater than 2.0 GHz-km, and a 1 turn 20 mm diameter wrap attenuation increase of less than or equal to 0.1 dB/turn at 850 nm.

21. The multimode fiber of claim 20, wherein and said inner annular region comprises a peak fluorine concentration in said inner annular region greater than 0.3 wt percent and a peak germania concentration in said inner annular region greater than 0.3 wt percent.

22. The multimode fiber of claim 20, wherein said inner annular region comprises a region of increasing fluorine concentration and decreasing germania concentration.

23. The multimode fiber of claim 20, wherein the germania concentration in said fiber is less than 2 wt. % at a radius of 25.0 microns.

24. The multimode fiber of claim 20, wherein the germania concentration in said fiber less than 0.5 wt. % at a radius of 26.0 microns.

25. The multimode fiber of claim 20, wherein the fluorine concentration in said fiber is less than 2 wt. % at a radius of 26.0 microns.

26. The multimode fiber of claim 20, wherein the fluorine with a concentration is greater than 0.1 wt. % at a radius of 26.0 microns.

27. The multimode fiber of claim 20, wherein at the midpoint of said inner annular region, the region comprises greater than 0.1 wt percent fluorine and greater than 0.1 wt percent germania.

28. The multimode fiber of claim 20, wherein said fiber further exhibits a 1 turn 10 mm diameter mandrel wrap attenuation increase, of less than or equal to 0.5 dB/turn at 850 nm.

* * * * *